Nov. 4, 1958     E. HEIMBS ET AL     2,859,116
TREATMENT OF COFFEE AND OTHER MATERIALS
Filed June 7, 1954     3 Sheets-Sheet 1
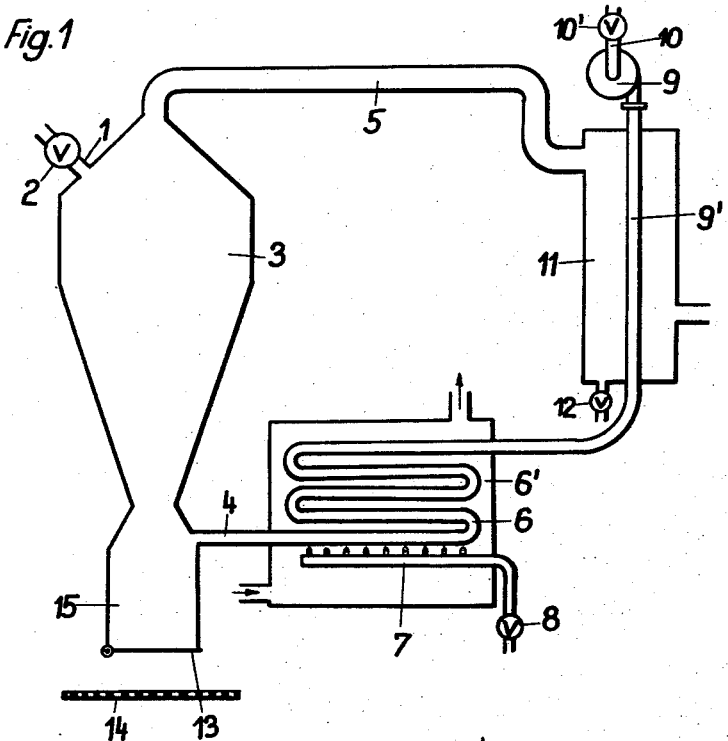
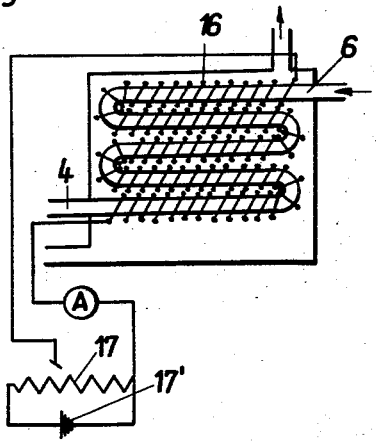
ERNST HEIMBS
WALTER KANGRO
INVENTOR.
BY Burgess + Dinklage
       Attorneys

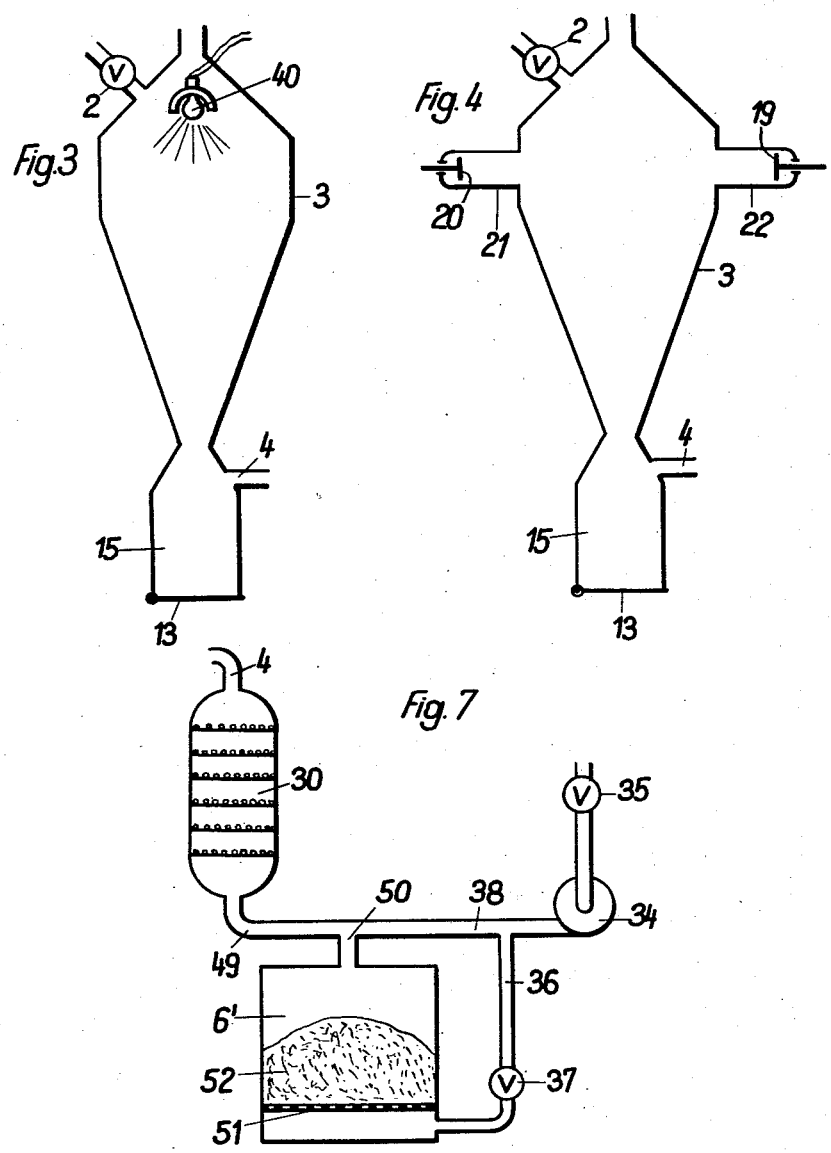

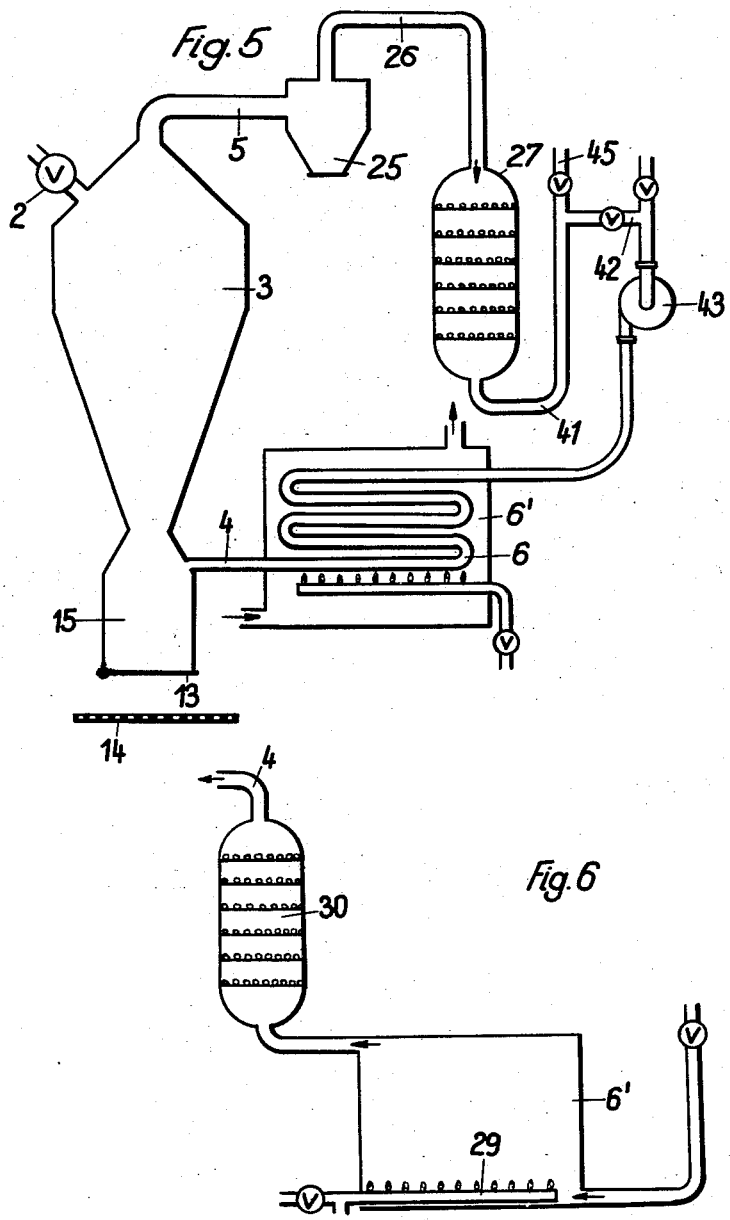

United States Patent Office 2,859,116
Patented Nov. 4, 1958

2,859,116

TREATMENT OF COFFEE AND OTHER MATERIALS

Ernst Heimbs and Walter Kangro, Braunschweig, Germany, assignors to Heimbs & Sohn, Braunschweig, Germany, a German corporation Application June 7, 1954, Serial No. 434,862

Claims priority, application Germany June 13, 1953

11 Claims. (Cl. 99—68)

This invention relates to improvements in the treatment of coffee and other materials. The invention more particularly relates to the roasting of coffee, coffee substitutes, cocoa or other foodstuffs or condiments.

Coffee and similar material are conventionally roasted by passing a stream of gas such as air over and through layers of the material to be roasted at high temperatures for a period of time. The conventional roasting methods have the disadvantage that each individual bean or particle will not be uniformly subjected to the heat treatment.

It has also been proposed to suspend the individual particles of the material to be roasted in an upwardly moving gas stream during the roasting operation. While this eliminates the use of the conventional rotating roasting drums or containers provided with rotating agitators, roasting chambers provided with heated surfaces or surfaces through which the energy utilized for the roasting is transmitted are still required. Thus, for example, the chamber in which the material was suspended and roasted was formed as a double-walled chamber. The gas used for the suspending and roasting was circulated and heated in the space between the chamber walls. In accordance with other processes, the particles were suspended by a gas stream in the chamber and at least partially roasted by means of a high frequency electrical field passed directly through the chamber walls.

These methods have certain serious disadvantages. The surfaces of the chamber through which the roasting energy passed or which were heated due to the heating of the gas were always overheated so that the individual particles of the material to be roasted were frequently burned on these surfaces and thus severely damaged.

In addition, the gas stream used for the roasting was often recycled and reheated in these processes. This constituted a substantial disadvantage inasmuch as aromatic substances, essential oils, chaff and other small particles would be carried away with the roasting gas stream. When the gas stream was reheated for the recycling, these materials would form highly objectionable combustion products which would contaminate the material being roasted. During the roasting certain quantities of moisture are released from the material into the gas stream. With the recycling, the water content of the stream is constantly enriched until a point is reached where the roasting process and the quality of the material roasted is seriously impaired.

One object of this invention is the roasting of coffee, coffee substitutes, cocoa or other foodstuffs, or condiments in a suspending gas stream without the above-mentioned disadvantages. This and still further objects will become apparent from the following description read in conjunction with the drawings in which:

Fig. 1 is a diagrammatic vertical section of an apparatus for effecting the method in accordance with the invention;

Fig. 2 is a diagrammatic vertical section of a different embodiment of the gas heating means shown in Fig. 1;

Figs. 3 and 4 are diagrammatic vertical sections of further embodiments of apparatuses effecting the invention;

Fig. 5 is a diagrammatic vertical section of an embodiment in accordance with the invention with gas recycling;

Fig. 6 is a diagrammatic vertical section of an embodiment of a device for the direct heating of the roasting and suspending gas in accordance with the invention; and, Fig. 7 is a diagrammatic vertical section of an embodiment of a device for heating the roasting and suspending gas with solid fuel in accordance with the invention.

In accordance with the invention, the coffee and coffee substitutes, cocoa or other foodstuffs or condiments to be roasted, are suspended in a roasting zone by an upwardly directed stream of gas which is passed into the roasting zone substantially free from materials formed during the roasting operation, and the surfaces of the roasting zone which may be contacted by the material being roasted are not allowed to assume a temperature substantially in excess of the roasting temperature. The surfaces of the roasting zone are kept free from contact with the gases being heated, the heating means of such gases and energy used for the heating, is not transmitted directly therethrough. The roasting zone will thus be free of any energy transmitting surfaces which the material being roasted may contact. The term "energy transmitting surfaces" as used herein is intended to designate any surfaces through which energy enters into the roasting chamber as, for example, heat transfer surfaces, electric energy producing surfaces, surfaces which serve for the production or passage of radiant energy or supersonic energy or the like.

By maintaining the roasting zone free from such surfaces, the material being roasted will be free from contact with any surface having a substantially higher temperature than the roasting temperature and damage due to excessively high temperature will be effectively avoided.

Since the treating gas is passed into the roasting zone substantially free of the impurities which may enter the same during the roasting, the previous disadvantages caused by the building up of these impurities in the recycled gases will be avoided.

In the embodiment as shown in Fig. 1, the heat energy required for the roasting is supplied by the gas used for suspending the material being roasted. The roasting chamber 3 is formed as a cylindrical chamber with a conically narrowing lower portion. The coffee or other material to be roasted is introduced into the chamber through the inlet pipe connection 1 which contains the shut-off valve 2. Gas, such as air, is passed upwardly through the chamber 3 at a velocity sufficient to maintain the coffee or other material in a state of suspension. The air is drawn in the conduit 10 by means of the blower 9 forced through the conduit 9' passing through the heat exchanger 11 through the heating coils or conduit 6 of the heater 6' and through the pipe line 4 into the chamber 3. After passage through the chamber, the gas passes out through the conduit 5 and heat exchanger 11. In the heat exchanger 11, the hot exhaust gases give a proportion of their sensible heat to the incoming fresh gas passing through the conduit 9'. The water of condensation which precipitates into the heat exchanger 11 is drawn off through the drain 12. The quantity of fresh gas circulated into the chamber 3 may be controlled by the valve 10'. The air passed through the conduit 6 in the heater 6' is heated to the roasting temperature by means of the gas burners 7. The heat may be regulated by the gas valve 8.

After the roasting operation, the stream of gas emerging from the pipe 4 is shut off and the material which has been suspended by the upwardly rising gas stream drops into the space 15 which is shut off at its lower end by the flap valve 13. The material after completion of the roasting is discharged by opening the flap valve 13 so that the same falls on the screen 14 on which it may be cooled.

The stream of treating gas may first be heated to a temperature below the roasting temperature by controlling the heating in the heater 6'. Thereafter, the temperature of the treating gas may be increased to the temperature sufficient to effect the roasting.

The treating gas itself may be varied during this operation. The heating to the roasting temperature, for example, may be effected in an inert gas such as nitrogen which is recovered, and the roasting proper may be effected in a suitable gas for that purpose as, for example, air.

With the use of the indirect heat exchanger 11 as shown, the heat content of the discharging stream of treating gas from the roasting chamber is transferred to the fresh treatment gas without the contact between the spent gas and fresh gas. Though this arrangement has a relatively low thermal efficiency, the same eliminates the special cleaning of a recycled gas stream.

If fresh air is used as a treatment gas, special attention may be paid to its purity and freedom from dust as, for example, by inserting a suitable filter in the line as, for example, a ceramic filter.

In place of the gas heater, any other conventional heater may be used. As shown in Fig. 2, the conduit 6 is heated by coils of resistance wire 16 which surround the same. The resistance wire 16 is heated by a source of current 17', which may be regulated by the variable resistance 17. While the electric heating illustrated is indirect heating, the same may also be effected in a direct manner by conducting the gases directly over an electric resistance heater, as, for example, by inserting the coils 16 within the conduit 6.

The heat required for the heating and/or roasting of the material 9 being treated may also be supplied in whole or in part by a source other than the gas used for suspending the material.

As shown in Fig. 3, the heat required for the heating and roasting of the material is supplied by an electrically heated source of radiation 40, as for example, one or more strong incandescent lamps positioned in the upper portion of the chamber 3. The height of the source of radiation 40 is so selected that the material being roasted cannot contact the same. The source of radiation may supply the total heat requirements or merely serve as an additional heater. In all other respects, the apparatus is identical in structure and function to that described in connection with Fig. 1, except that when the source radiation 40 supplies the total heat requirements, the heater 6' is not necessary.

The material being roasted may also be submitted to a field of high frequency electrical energy or supersonic energy. This source of energy should be so arranged that the material to be roasted or the roasted products do not come in contact with the surfaces which radiate this energy or through which this energy passes. Such an arrangement is shown in Fig. 4.

In Fig. 4, the roasting chamber 3 is the same in structure and operation as described in connection with Figs. 1 and/or 3, except that two opposed tubular extensions 21 and 22 are provided at the upper portion. These tubular extensions contain the electrodes 19 and 20, from which high frequency currents emanate. Due to the tubular extensions 21 and 22, the material being roasted does not come in contact with the electrodes or any surface through which the energy is transmitted.

A similar arrangement may be provided for transmitting ultrasonic oscillations to the material being roasted, the introduction of these oscillations being effected through suitable plates corresponding to electrodes 19 and 20.

In the embodiment as shown in Fig. 5, the entire heat energy required for the roasting is provided by the circulating gas stream which maintains the material in suspension and which is recycled after purification and reheating. The gases emerging from the roasting chamber 3 pass through the conduit 5 and through the cyclone 25 into the line 26. In the cyclone separator, the gas is separated from entrained particles of dust and the like. The conduit 26 is connected to an absorber 27 of conventional construction in which the entrained undesirable roasting products are removed from the roasting gas by absorption with suitable agents. The roasting gases freed from these undesirable constituents pass through the conduit 41 and conduit 42 to a blower 43. The conduit 42 contains a valve thus permitting the quantity of gas passing therethrough to the blower 43 to be controlled or interrupted. Fresh air may also be introduced in admixture with the recycled gas by means of the conduit 45 which also contains a valve. The blower 43 forces the purified recycled gas and/or the fresh gas through the gas heater 6' and pipe 4 back to the roasting chamber. The operation of this portion of the apparatus is identical with that described in connection with Fig. 1. The recycled gas passing through the heater 6' and into the chamber 3 has been freed of all products of the preceding roasting, such as steam, essential oils, chaff, small particles of the material being roasted itself, and the like, by means of the cyclone 25 and absorber 27.

In addition to the indirect gas heating as illustrated in Figs. 1 and 5, the heating may be effected in any other desired manner, as for example, by using fuel oils or solid fuels, and it may be effected as either a direct or indirect heating. When the heating is effected as a direct heating, the treatment gases may enter the roasting chamber laden with combustion products of the fuels burned. It is often necessary and desirable to remove these combustion products when the heating is a direct heating. In particular, any sulfur compounds formed by the combustion should be removed.

In the embodiment as shown in Fig. 6, the heater 6' is in the form of a direct heater utilizing an open gas burner 29. The gas used for the suspension and heating of the material being roasted is circulated into this heater 6' prior to being passed through the conduit 4. In the heater 6', the gases are directly heated by the gas burner 29 and mixed with the combustion products 4. From the heater 6', the gas passes through the absorber 30, thereupon being passed through the pipe line 4 into the roasting chamber 3. In the absorber 30, which is of conventional construction, the gas is freed from the various injurious constituents of the combustion by absorption or adsorption. Instead of the burner 29 being an open gas burner, the same may, for example, be a fuel oil burner.

As shown in Fig. 7, the heating of the gas stream is a direct heating for use with solid fuels. A blower 34 passes fresh air into the conduits 36 and 38. The air drawn in may be controlled by the valve 35, and the amount of air passing through conduit 36 may be controlled by the valve 37. In the heater 6', a bed of solid fuel, such as coke, is maintained on the grate 51 and burned. The air passing through conduit 36 passes beneath the grate through the bed of fuel, and after being heated passes through the conduit 50 and is mixed with the air coming through the conduit 38. The mixed stream of hot fresh gases are passed through the conduit 49 into the absorber 30 in which the undesirable combustion products are removed and, thereafter, through the pipe 4 to the roasting chamber, where the same pass upwardly, suspending and roasting the material being treated.

When roasting material which has been dried or is dry, the water content is frequently too low to ensure a smooth roasting operation in the desired manner. In this case, the moisture of the roasting gas is, in accordance with the invention, adjusted to the desired value. This measure may be effected with particular ease and accuracy if the treatment gas is heated electrically or indirectly.

In accordance with the invention, the roasting chamber proper is not closed at the bottom by any sort of shut-off device, but rather remains open, i. e. into the space 15. The material which is to be roasted is passed in from the top into the stream of treatment gas which is already moving upwardly. The material leaves the roasting chamber after completion of the roasting, falling out into the space 15 after the stream of gas has been shut off. In this connection, the roasted products do not come in contact with any overheated or energy surfaces. The surfaces which the material may contact, and the surface of the space 15 which the material falls into, may be protected from the action of the hot gases or other sources of energy by, for example, a valve, such as a slide valve, which may be open or shut off shortly before the stream of treatment gas is shut off.

In accordance with a further feature of the invention, the optimum time for the roasting in any particular gas velocity and temperature is effected by roasting a predetermined partial amount of the material until the roasting operation has been completed, and using this period of time to determine the roasting process for all further identical partial quantities of the same material as, for example, the same coffee mixture.

With this determination of time, it is possible to effect a process automatically, as for example, by having valves such as the valves 2, 10, and 13 in Fig. 1 operate automatically in a set time order and interval, as for example by mechanical or electrical timing and control means or the like.

It is also advantageous to carry out the processes preceding the roasting and/or the processes following the roasting in intervals corresponding to the time of roasting.

The above described method determining the optimum roasting time is a substantial advantage over the conventional methods, in which the operator would remove samples from time to time to examine the same, and each time pour these samples back into the roasting device, such as the rotating roasting drum. With a withdrawal and re-introduction of the sampled material in this manner, a completely uniform treatment was not possible.

We claim:

1. Method for the roasting of coffee, coffee substitutes, and cocoa, which comprises establishing a roasting zone, maintaining such a material suspended in said zone by passing a gas substantially free from roasting impurities upwardly through said zone at a velocity sufficient to maintain the material suspended therein, heating the material in said zone to roasting temperature, maintaining the surface of said zone contacted by the material at a temperature not in excess of the roasting temperature and free from energy transfer therethrough, and thereafter discharging roasted material from said zone.

2. Method according to claim 1, in which said heating of the material in said zone is at least partially effected by heating the gas prior to its being passed upwardly through said zone.

3. Method according to claim 1, which includes subjecting the suspended material in said zone to the action of radiant energy while maintaining the material free from contact with surfaces generating and transmitting said energy.

4. Method according to claim 1, which includes subjecting the suspended material in said zone to the action of high frequency electric energy while maintaining the material free from contact with surfaces generating and transmitting said energy.

5. Method according to claim 1, which includes subjecting the suspended material in said zone to the action of supersonic energy while maintaining the material free from contact with any surfaces generating and transmitting said energy.

6. Method according to claim 1, in which the heating of the material in said zone to roasting temperature is effected by passing said gas stream upwardly through said zone with a temperature sufficient to heat the material to roasting temperature.

7. Method according to claim 1, in which the gas is heated prior to being passed upwardly through said zone to a temperature sufficient to at least partially heat the material to roasting temperature, and which includes removing the roasting impurities from at least a portion of the gas after passage through said zone and reheating and recycling the purified gas.

8. Method according to claim 1 in which the gas is heated prior to being passed upwardly through said zone to at least partially heat the material in said zone to roasting temperature, and which includes passing the gas, after passage through said zone, in indirect heat exchange contact with fresh gas being passed to said zone.

9. Method according to claim 1, in which said gas is air.

10. Method according to claim 1, in which gas is directly heated by the combustion of fuel prior to being passed upwardly through said zone to supply at least a portion of the heat needed for heating the material to roasting temperature and removing at least a portion of the combustion products prior to the passage of gas upwardly through said zone.

11. Method according to claim 1, which includes maintaining a predetermined moisture content in the gas being passed upwardly through said zone.

References Cited in the file of this patent

UNITED STATES PATENTS

| | | |
|---|---|---|
| 1,104,990 | Harding | July 29, 1914 |
| 1,547,655 | Johnston | July 28, 1925 |
| 1,900,072 | Quinn | Mar. 7, 1933 |
| 1,991,190 | Backer et al. | Feb. 12, 1935 |
| 2,212,120 | Kneale et al. | Aug. 20, 1940 |
| 2,348,066 | Goldfine | May 2, 1944 |
| 2,497,501 | Himmel et al. | Feb. 14, 1950 |
| 2,585,970 | Shaw | Feb. 19, 1952 |
| 2,593,983 | Chalupa | Apr. 22, 1952 |
| 2,602,134 | Nelson | July 1, 1952 |
| 2,632,706 | Montgomery | Mar. 24, 1953 |
| 2,716,936 | Kopf | Sept. 6, 1955 |
| 2,721,510 | Casuell | Oct. 25, 1955 |